United States Patent [19]
Anderson

[11] 4,301,452
[45] Nov. 17, 1981

[54] STATION WATCH ALARM SYSTEM

[76] Inventor: Lawrence F. Anderson, 14272 Wicks Blvd., San Leandro, Calif. 94577

[21] Appl. No.: 23,691

[22] Filed: Mar. 26, 1979

Related U.S. Application Data

[63] Continuation-in-part of Ser. No. 680,685, Apr. 27, 1976.

[51] Int. Cl.³ .................. G01S 13/00; G01S 3/02
[52] U.S. Cl. .................. 343/5 EM; 343/7 ED; 343/7.3; 343/112 CA
[58] Field of Search ......... 340/568; 343/5 PD, 7 ED, 343/5 EM, 7.3, 112 CA

[56] References Cited

U.S. PATENT DOCUMENTS

| | | | |
|---|---|---|---|
| 3,115,622 | 12/1963 | Jaffe | 340/541 |
| 3,151,322 | 9/1964 | Hildebrandt | 343/7.3 |
| 3,188,631 | 6/1965 | Birtley | 343/9 |
| 3,648,283 | 3/1972 | Busch et al. | 343/5 EM |
| 3,660,846 | 5/1972 | Anderson | 343/7 ED |
| 3,732,555 | 5/1973 | Strenglein | 343/5 PD |
| 4,107,684 | 8/1978 | Watson, Jr. | 343/5 PD |
| 4,112,419 | 9/1978 | Kinoshita et al. | 343/5 PD |
| 4,136,338 | 1/1979 | Antenore | 340/568 |

*Primary Examiner*—S. C. Buczinski
*Attorney, Agent, or Firm*—Alvin E. Hendricson

[57] ABSTRACT

A system which cooperates with a conventional radar system produces an alarm upon departure of a reference target from a predetermined area relative to a vessel as an indication of vessel drift from anchor or assigned station by the use of a variable range gate and a variable azimuth gate together with discriminating and timing or counting means.

5 Claims, 4 Drawing Figures

STATION WATCH ALARM SYSTEM

This is a continuation-in-part of my prior copending U.S. patent application Ser. No. 680,685, filed Apr. 27, 1976, for "AUTOMATIC COLLISION WARNING TARGET DISPLAY SYSTEM".

BACKGROUND OF INVENTION

Radar systems have long been known and widely employed to locate physical bodies, such as vessels, airplanes, bodies of land, and the like. There have also been developed a substantial number of improvements and extensions of basic radar systems including automatic tracking systems for target, collision calculators and collision warning systems. Prior art cited in U.S. Pat. No. 3,660,846, and U.S. patent application Ser. No. 680,685, filed Apr. 27, 1976 for "AUTOMATIC COLLISION WARNING TARGET DISPLAY SYSTEM," is in part, relevant to various of these developments. Automatic warning systems are set out in the above-noted patent and patent application, and the present invention is an extension thereof particularly with regard to warning of drifting of a vessel at anchor although the present invention has other uses, as noted below.

Many, if not most, ocean-going vessels are equipped with some type of radar, although some are quite rudimentary, however, such systems normally have only a limited utility, i.e. location of physical bodies or targets and displaying the information. The above-noted patent and patent application extend the utility of radar systems, but do not extend the utility into vessel at anchor conditions except insofar as possible collision is concerned. It is conventional on a vessel at anchor to have the bridge watch check bearings of fixed objects to guard against drift of the vessel at anchor as by dragging the anchor. The present invention is capable of performing this operation, among others, to thus relieve personnel of this task and also to preclude human error.

SUMMARY OF THE INVENTION

The system of the present invention is adapted to operate with a conventional radar set or system which directionally transmits or propagates electromagnetic radiation from a scanning antenna and which also receives such radiation that is reflected from objects in the path of the radiation. The present invention operates upon signals of a conventional radar set to adjustably establish a watch zone wherein an object or target is to be located and to automatically produce alarm signals upon the absence of such object from the zone for a predetermined period of time. Provision is herein made for discrimination against false targets reported or displayed by the radar set for many circumstances can give rise to radar signals that do not actually represent predetermined targets, but instead, result from transitory conditions and/or disturbances.

The watch zone of the present invention is established by a variable range gate and a variable azimuth gate operating upon radar signals to render an alarm circuit inoperative as long as target signals or radar echo signals are received from the watch zone. Echo width discrimination and echo verification discrimination (repetition for a predetermined number of scans) are employed to exclude spurious signals from operating the systems. This invention may be readily incorporated in a collision warning system such as described in the above-noted U.S. patent and patent application.

The establishment of a watch zone and alarm associated therewith, as identified above, provides many capabilities, not the least of which is the warning of drift or shifting of a vessel at anchor. By establishing a watch zone of predetermined location and extent to encompass a fixed object, any material change of physical location of a vessel carrying the present invention will cause the alarm hereof to sound or otherwise execute an alarm so that corrective action may be taken, and, in fact, must be at least considered. The least action to be taken is the turning off of the present invention, if no other action is required. The positively acting alarm system hereof continues to cause some type of alarm, such as visual or audio until no radar signals maintain alarm operation or the system is turned off. Thus the system forces an operator or the like, to take some action as to whether or not there may be danger and does not leave the basic decision to chance or the possibility of human error. The watch zone established by the present invention may also be employed, for example, to keep station between moving vessels as in pair trawling and to monitor the continued fixed location of vessels subject to some type of surveillance, as in quarantine or the like. Additionally, the present invention may be directly employed in computer aided collision avoidance systems to produce an alarm when an acquired target is lost from set range limits and azimuth sector.

DESCRIPTION OF FIGURES

The present invention is illustrated as to a single preferred embodiment in the accompanying drawing wherein.

DESCRIPTION OF PREFERRED EMBODIMENT

Figure 1:
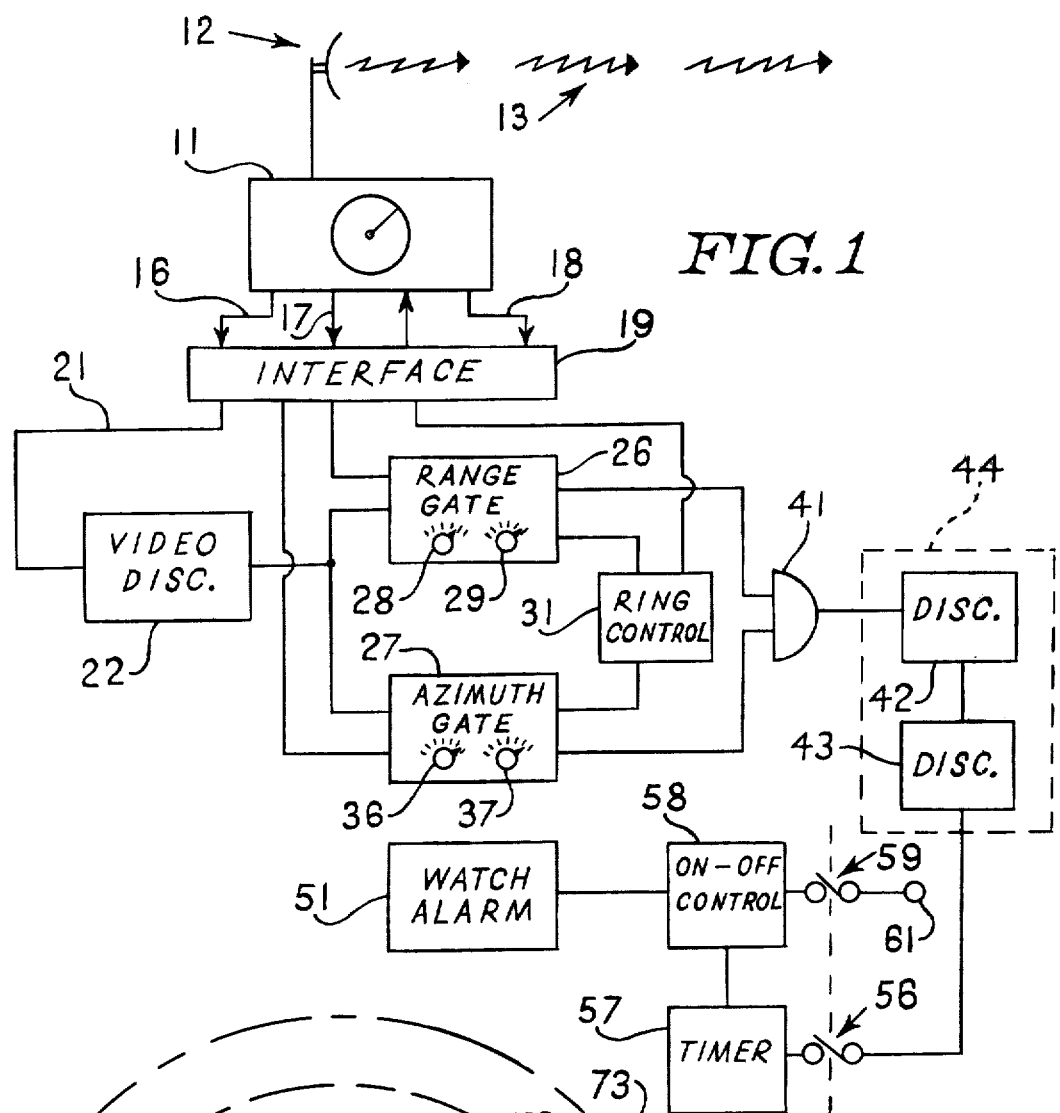
FIG. 1 is a schematic block diagram of a station watch alarm system in accordance with the present invention.

The present invention is illustrated as to a preferred embodiment thereof in the block diagram of FIG. 1, and referring thereto, there will be seen to be shown a conventional radar system 11 which may, for example, be mounted upon a ship and which includes a directional rotatable or scanning antenna 12 transmitting electromagnetic radiation and receiving echoes thereof from solid objects in the path of the radiation. The radar system or set 11 may be quite conventional in propagating a narrow beam of pulse radiation, as indicated at 13, and may, in fact, comprise a system already installed on a vessel or the like. Such a radar set or system commonly includes a transceiver connecting the antenna to a mixer that is, in turn, connected through an IF detector and video amplifier to a video mixer. Timing circuits and a range marker generator are also connected to the video mixer which applies signals to a plan position indicator (PPI) for the display of information with respect to targets from which radar signals are reflected. Upon the oscilloscope face of the PPI, a traced line revolves depicting the revolution of a radar antenna and luminous marks are generated on the scope by radar signals reflected to the antenna 12 from solid objects. The present invention operates by certain of the radar signals which are shown to be applied to a heading line 16, video line 17, and trigger line 18 to interface circuitry 19 for application to the circuitry of the present invention. The interface 19 actually comprises an interface logic circuit which employs only conventional elements and circuits to provide compatability of signals between the radar set 11 and the circuitry of the present invention and vice versa.

Video signals from the radar set through the interface circuit 19 are applied through a line 21 to a video discriminator 22 which preferably includes a video amplifier having a sensitivity control. The input video signal of the present invention contains information relative to the amplitude, pulse width, and the distance or range of signals received by the radar system while the video amplifier and discriminator 22 provides for applying only such signals as have an amplitude in excess of an adjustable threshold level to the following circuitry. The output of the amplifier and discriminator 22 is applied to a variable range gate 26 and to a variable azimuth gate 27. The variable range gate 26 also receives trigger pulses from the radar set through the interface circuitry 19 and includes control means 28 for adjusting the inner range of the gate and control means 29 for adjusting the outer range of the gate and consequently establishes a variable range zone between the inner and outer limits. These range limits of the range gate 26 are applied to a ring intensity-control circuit 31 which, in turn, applies signals representative of the range limits back to the radar set, as at the video mixer thereof for displaying or tracing two visible rings on the PPI scope corresponding to the inner and outer limits of the range gate.

The circuit of FIG. 1 additionally includes a variable azimuth gate and timer 27, as noted above, which is supplied with signals from the video amplifier and discriminator 22, and also with heading signals from the radar set. This variable azimuth gate 27 includes bearing limit control means 33 and 34 for adjusting the beginning and ending of the azimuth sector from which radar signals are passed by the azimuth gate. Signals representative of these bearing limits are applied to the ring intensity control circuits 31 and thence back to the radar set for limiting the angular extent of the range line traced thereon from the variable range gate, so that there is displayed upon the scope 17, a pair of range lines extending only between the bearing limits of the selected azimuth sector.

The variable range gate 26 produces output signals only upon receipt of radar echo signals in the selected range and similarly, the variable azimuth gate 27 produces output signals only upon the receipt of radar echo signals from the azimuth sector of this gate. Coincidence of the range gate and azimuth gate output signals is determined by applying same to an AND gate 41 which thereupon passes radar echo signals only from targets in the zone of interest which is herein termed the station watch zone.

The present invention provides for verification of radar targets in order to exclude spurious radar echo signals and possible temporary disappearances of chosen targets, such as buoys or the like. Referring again to FIG. 1 of the drawings, it will be seen that echo signals passed by the AND circuit 41 are applied to a first discriminator circuit of a target verification discriminator 44, which may be termed an echo width discriminator or m out of n counter which is provided for the purpose of determining the size of the target reflecting the echo signals. This discriminator may operate in one of a variety of conventional manners to verify that the target is of some predetermined size, and, if desired, manually adjustable control means may be included in the echo with discriminator to provide the operator with capability of adjusting the desired size of target to be maintained in the station watch zone. The first discriminator 41 only passes signals for target sizes equal to or greater than the preselected size and these echo signals are then applied to a second discriminator 43 or verifier which determines whether or not the target persists through a predetermined number of radar antenna scans or revolutions or alternatively is present during m out of n revolutions. Either or both of the first and second discriminators 42 and 43 are generally termed the target verification discriminator, inasmuch as either one or both provide the function of preventing the passage of false signals and the AND circuit 41 may be considered as a part thereof.

An output from the target verification discriminator 44 on an output line 46 only occurs when a target remains within the station watch zone established by the variable range and azimuth gates. These signals are herein employed to prevent the sounding of a watch alarm 51, i.e. the presence of a target in the watch zone prevents the sounding of an alarm. On the other hand, the absence or at least continued absence of a target from the watch zone causes the watch alarm 51 to sound or otherwise operate to produce an audio or visual alarm. The circuit of FIG. 1 is shown to include connection of the discriminator output line 46 through a switch 56 to a timer 57 that, in turn, is connected to operate an on-off control circuit 58.

The control circuit 58 is connected through a switch 59 to a power supply terminal 61 and is also connected to the watch alarm circuit 51 for turning the watch alarm on or off. In this arrangement the switches 56 and 59 are shown to be ganged together. The discriminator output signal on line 46 is applied to the control circuit 58 to maintain same non-conducting when the switches 56 and 59 are closed, and signals are applied to the line 46. When signals disappear from the line 46 indicating that the target has disappeared from the watch zone, the timer 57 is actuated and after some predetermined period of time, such as 10 seconds, for example, will operate the on-off control circuit 58 so that same passes current from the power supply 61 to the watch alarm 51 to operate the latter. It will be seen that the watch alarm 51 will continue to operate until it is turned off, and this can only be accomplished by opening the switch 59 to remove power from the watch alarm or by resuming output signals from the discriminator 44 to shut off power to the watch alarm by the on-off control circuit 58. This latter situation occurs only by replacing the target in the watch zone as might be accomplished, for example, by changing the position of the vessel carrying the radar system or possibly, the course or speed thereof if the vessel is underway and keeping station on another vessel.

It will thus be seen that the present invention provides a positive acting watch alarm which is actuated by disappearance of a target from a watch zone and which necessarily requires action by an operator, such as a bridge officer or the vessel. Thus the basic determination of a vessel drifting at anchor, for example, is made by the present invention, so that some action must be taken by an operator. The least of these actions is the disconnecting of a system as might, for example, be decided upon under the conditions that an anchored vessel is getting underway so that the predetermined target in the watch zone will no longer remain therein. An alternative action might, for example, be some movement of the vessel to return the predetermined target to the watch zone.

Figure 2:
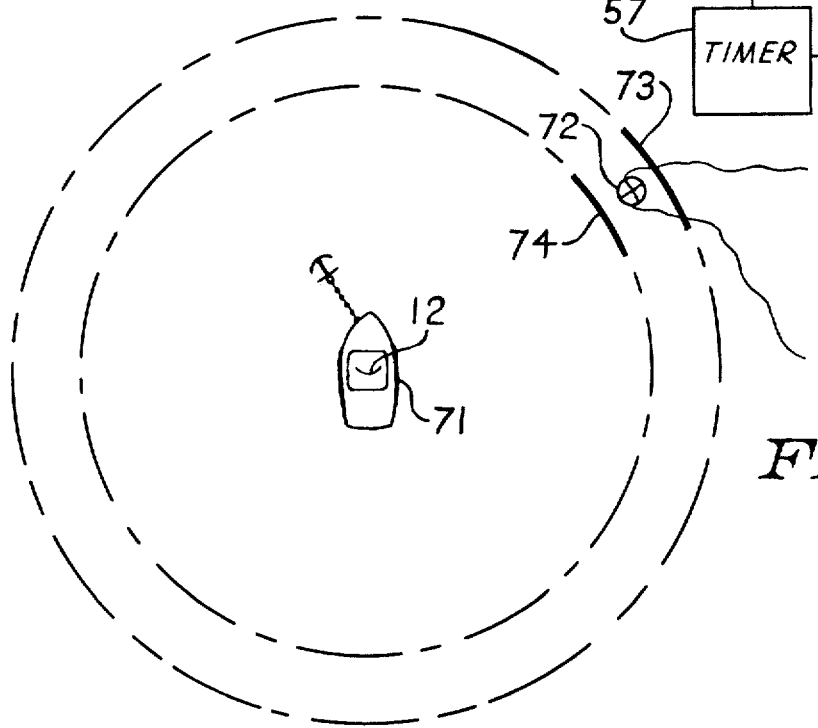
FIG. 2 is a pictorial representation of a station watch function, such as an anchor watch.

In FIG. 2 of the drawings, there is schematically and pictorially illustrated a vessel 71 having the radar antenna 12 thereon and anchored, for example, at some predetermined range and bearing from a fixed point, such as an anchored buoy 72, or possibly, a lighthouse on a point of land. With the system of the present invention in operation, there would be traced on the radar scope, a pair of short spaced-apart lines 73 and 74, bracketing a radar "blip" indicative of the selected target 72. The range and azimuth gates 26 and 27 are adjusted so that these lines do bracket the target and with the switches 56 and 59 of FIG. 1 closed, the watch alarm system is then armed to operate whenever the target 72 disappears from the bracketed watch zone for a predetermined short period of time. It is, of course, appreciated that the radar antenna 12 continues to operate to produce radar signals containing information as to range and bearing of targets identified by echo signals, as well as heading and trigger signals, all for operation of the circuit of the present invention. Under these circumstances, and even though the bridge of the vessel 71 may be unattended the vessel and occupants are protected from inadvertant vessel movement from anchored position. It is realized that a vessel at anchor, for example, will swing with the movement of water and possible change in direction of wind, however, the watch zone may be appropriately dimensioned and oriented to maintain the target therein even during these circumstances. The degree of movement of the vessel which may be accommodated without sounding the watch alarm is readily adjusted by an operator through the establishment of a watch zone of desired size and physical configuration. The added safeguards of the present invention with respect to target verification and also time delay before alarm actuation is highly advantageous in minimizing and, in fact, normally preventing false alarms, as might otherwise be generated by variety of circumstances.

Figure 3:
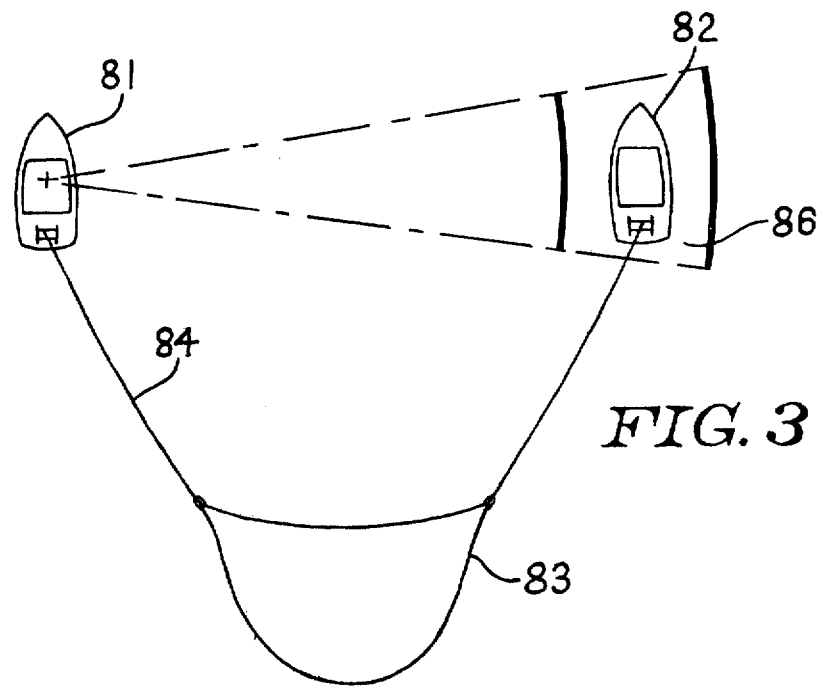
FIG. 3 is a schematic representation of a station watch in accordance with the present invention employed in pair trawling.

The present invention is applicable to a variety of different situations including the opposite of the one described immediately above. Thus, for example, a radar system located at a fixed location as on a shore installation may be employed to insure maintainance of a vessel, for example, within a watch zone at predetermined bearing and range limits from such radar set. Additionally, the present invention is applicable to the maintainance of stations between vessels underway, such as illustrated in FIG. 3 of the drawings. Referring to FIG. 3, there will be seen to be illustrated a pair of fishing vessels 81 and 82 which are trawling for fish with a net 83 secured to a cable 84 extending in an arc between the sterns of the two vessels 81 and 82. With one of the vessels 81 carrying the present invention in conjunction with a radar set thereon, it is only necessary for an operator to adjust a watch zone 86 encompassing the other vessel 82, and to actuate the system of the present invention in order for same to automatically warn an operator of vessel 81 of any undesirable change in relative position or courses of the two vessels. Considering this point further, it will be seen that should the vessels 81 and 82 drift apart to a separation greater than the outer limit of the variable range gate of the present invention, there will automatically be produced a station warning alarm on the vessel 81 so that corrective action can be taken to return the vessels to desired relationship. Similarly, if the vessel 81 carrying the present invention were to change course by more than a small amount, this would move the watch zone away from the vessel 82, so that again, the watch alarm would be sounded on the vessel 81 and corrective action could be readily taken. It would also be appreciated that both of the vessels 81 and 82 may employ the present invention to bracket the other vessel in a watch zone.

Figure 4:
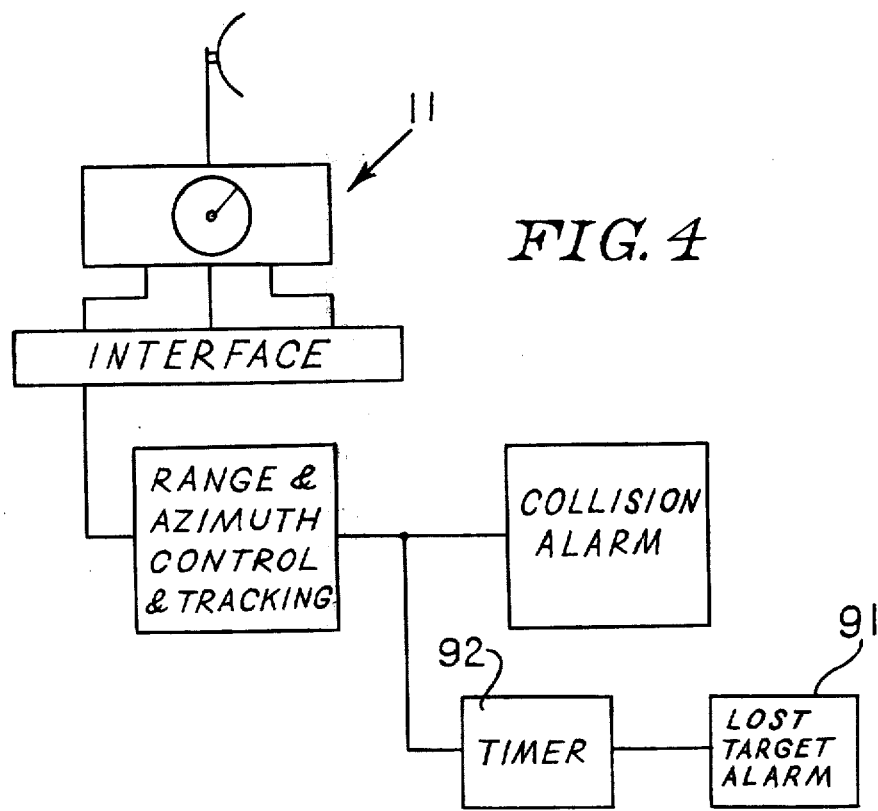
FIG. 4 is a schematic block diagram of a station watch system in accordance with the present invention employed in a collision avoidance system.

The station watch alarm system of the present invention is additionally useful in various other applications including a collision avoidance system by the provision of a lost target alarm in addition to collision alarms. In FIG. 4, there is illustrated in block form, a collision avoidance system cooperating with a radar set 11 wherein the collision avoidance system incorporates an acquisition capability whereby a warning zone or alarm zone of the system is locked upon a target to follow same. The present invention operates upon echo signals from a target that has been tracked by the system as through a computer, and at any time the echo signals terminate this will cause a lost target alarm 91 to be activated after some predetermined period of time, as determined by a timer 92. The tracking of targets in a collision avoidance system, for example, provides a small radar window encompassing the target and the present invention may be advantageously employed to produce a warning or alarm when the target disappears from this window. The alarm produced under these circumstances is in actuality, a watch alarm, for it is generated when a target disappears from a predetermined although moveable watch zone. In the circuit of FIG. 4, this watch alarm is sometimes termed a loss target alarm for indeed a target being tracked has been lost.

The present invention has been described above with respect to a preferred embodiment thereof and various applications thereof. It will be appreciated by those skilled in the art that numerous variations and modifications of the present application are possible within the scope of the present invention, and also that the present invention may be employed under a wide variety of circumstances with advantageous results. It is thus not intended to limit the present invention to the precise terms of description or details of illustration.

What is claimed is:

1. An automatic station watch system adapted for use with a radar system producing echo signals containing information relative to bearing and range of targets reflecting transmitted radar pulses an having a display scope upon which echo signals are displayed as to range and azimuth comprising a variable range gate having an adjustable inner and outer ranges for setting a range zone adapted for connection to said radar system for producing output signals only upon receipt of echo signals from targets within said range zone;

a variable azimuth gate having adjustable bearing limits for setting an azimuth sector and adapted for connection to said radar system for producing output signals only upon receipt of signals from targets within said sector, means applying signals representing the adjusted inner and outer ranges of said range gate within the bearing limits of said azimuth gate to said radar system for display as lines outlining a station zone on said display scope normally encompassing a predetermined station target, a target verification discriminator connected to receive output signals from said variable range gate and said variable azimuth gate for producing output signals only upon a coincidence of input signals, and an alarm circuit including an alarm signal generator and control means responsive to the absence of discriminator output signals for operating said alarm signal generator to produce alarm signals.

2. The system of claim 1 further defined by
switching means selectively connecting said system to a collision avoidance system.

3. The system of claim 1 further defined by
said target verification discriminator including a first discriminator connected to receive signals from said variable range and azimuth gates and producing an output only upon receipt of a predetermined number of signals out of a possible number of successive radar pulses and a second discriminator producing an output only upon the repetition of output signals from said first discriminator for a predetermined number of radar scans.

4. The system of claim 1 further defined by timing means connecting said discriminator and alarm circuit control means for operating said alarm signal generator only after a predetermined adjustable period of time of absence of discriminator output signals.

5. The system of claim 1 further defined by said target verification discriminator including an AND circuit connected to the output of said variable range gate and variable azimuth gate for producing output signals only upon coincidence of said gate signals and having the output thereof coupled to the input of said target verification discriminator.

* * * * *